US007735260B2

(12) United States Patent
Holliday

(10) Patent No.: US 7,735,260 B2
(45) Date of Patent: Jun. 15, 2010

(54) HANGING PLANT SAUCER

(75) Inventor: Edward J. Holliday, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 12/230,542

(22) Filed: Aug. 29, 2008

(65) Prior Publication Data

US 2010/0050511 A1    Mar. 4, 2010

(51) Int. Cl.
*A01G 9/02* (2006.01)
*A01G 9/04* (2006.01)
(52) U.S. Cl. .................... 47/67; 47/66.4; 47/71
(58) Field of Classification Search .......... 47/67, 47/66.3, 71, 904, 66.4; 248/318; *A01G 9/02, A01G 9/04*
See application file for complete search history.

(56) References Cited

U.S. PATENT DOCUMENTS

| 941,448 | A | * | 11/1909 | Haglund | 248/318 |
| 1,095,504 | A | * | 5/1914 | Jannoch | 47/67 |
| 3,445,045 | A | * | 5/1969 | Panning | 223/95 |
| 3,854,242 | A | * | 12/1974 | Gladstein | 47/67 |
| 4,073,457 | A | * | 2/1978 | Batts et al. | 248/340 |
| 4,109,415 | A | * | 8/1978 | Hall | 47/67 |
| D259,712 | S | * | 6/1981 | Heydenreich | D11/164 |
| 5,390,888 | A | * | 2/1995 | Rogers | 248/318 |
| D362,829 | S | * | 10/1995 | Wagner | D11/164 |
| 5,779,210 | A | * | 7/1998 | Canson et al. | 248/318 |
| D432,944 | S | * | 10/2000 | Harris | D11/148 |
| 7,287,736 | B2 | * | 10/2007 | Hauck | 248/318 |
| 2006/0059776 | A1 | * | 3/2006 | Luken et al. | 47/67 |
| 2009/0212187 | A1 | * | 8/2009 | Chen | 248/318 |

FOREIGN PATENT DOCUMENTS

| FR | 2659213 A1 | * | 9/1991 |
| FR | 2784966 A1 | * | 4/2000 |
| JP | 10179356 A | * | 7/1998 |
| JP | 2008142087 A | * | 6/2008 |

OTHER PUBLICATIONS

Machine translation of FR2784966.*

* cited by examiner

*Primary Examiner*—Son T Nguyen
*Assistant Examiner*—Shadi Baniani
(74) *Attorney, Agent, or Firm*—Jacobson Holman PLLC

(57) ABSTRACT

A one-piece molded hanging plant saucer includes three pairs of opposed hook arms connected to a bowl-shaped base. Each pair of hook arms is formed by the frictional interengagement of two arms extending vertically from a living hinge formed at an extension of a generally circular planar lip extending outwardly around the upper periphery of the base. Each pair of interconnected hook arms provides a double thickness of material to increase strength of support for the hanging plant saucer. As manufactured in the molded condition, the hook arms are generally co-planar with the planar lip so that multiple saucers are readily stackable.

21 Claims, 5 Drawing Sheets

HANGING PLANT SAUCER

FIELD OF THE INVENTION

The present invention is directed to a hanging plant saucer having hook arms to secure the hanging plant saucer to a plant pot or to a suspension system used to elevate a hanging plant above the floor.

BACKGROUND OF THE INVENTION

The appearance of homes, gardens, office atriums and other public places are enhanced by the appearance of hanging plants. These plants are usually suspended by a wire or chain to an elevated position above the floor.

Hanging plants located in a pot must include bottom surface openings for the drainage of excess water, so as to prevent a collection of water at the bottom of the plant pot which can cause deleterious effects to the root system of the plant. Therefore, when watering hanging plants, unless an exact amount of moisture is added to the soil, sufficient to only saturate the soil, the hanging plants have a tendency to leak excess water through the bottom openings of the pot. A hanging plant saucer is therefore usually provided underneath the pot to retain excess water and prevent damage to a floor or other objects located below the hanging plant.

Accordingly, it is an object of the present invention to provide an attractive hanging plant saucer which can be suspended from the plant pot or the suspension system supporting the plant pot, so as to collect excess water draining from the hanging plant, and which can be provided to the user at a reasonable cost.

SUMMARY OF THE INVENTION

By the present invention, a hanging plant saucer for hanging plants includes a generally bowl-shaped base and three pairs of opposed hook arms which extend upwardly when each pair is connected together. The three pairs of connected hook arms can then be secured to either a plant pot of a hanging plant or to the wires or chains which suspend a plant pot in the air.

The hanging plant saucer of the present invention is preferably manufactured of a relatively thin, clear thermoplastic polymer, preferably polyethylene terephalate (PET), polyvinyl chloride (PVC), styrene-acrylonitrile (SAN) or other similar polymer, by a blow molding process or a thermal forming process. The pairs of hook arms extend from and are spaced equally about a generally circular planar lip formed around the periphery of the uppermost edge of the bowl-shaped base. The opposed hook arms are anchored to the planar lip by integral lip extensions and radially outwardly extending living hinges, thereby making a robust, secure connection of the hook arms to the base.

The base includes a radially outwardly tapering sidewall tapering constantly and continuously radially outwardly from a generally flat bottom surface to the peripheral planar lip. The sidewall includes a plurality of radially inwardly projecting ribs extending the full height of the sidewall which ribs, together with the circular planar lip, provide added strength and durability to the sidewall and to the base.

The bottom surface of the saucer includes a plurality of upwardly projecting protrusions which are shaped similar to half of a football or a prolate spheroid. The protrusions extend radially, are equally spaced around the base bottom surface and are preferably six in number. Excess water draining from the plant pot is thereby collected on the bottom surface of the base.

When the saucer of the present invention is manufactured, in a molded condition, the three pairs of opposed hook arms, six in total hook arms, extend in a horizontal plane coincident and integral with the circular planar lip located at the uppermost edge of the base. Each hook arm includes at least one molded connecting element for interconnecting together the hook arms of each pair. In a preferred embodiment, the molded connected elements are in the form of inter-engaging complementary-shaped sets of male projections and female recesses. The male projections on one hook arm of a pair fit into the female recesses of the other hook arm of the pair by a friction or interference fit to lock the pair of hook arms together in a position tilted radially inwardly towards a center of the base portion. Each pair of the hook arms preferably includes two male projections or two female recesses.

Each hook arm also preferably includes a molded edge recess extending about substantially the entire periphery of each hook arm and a molded lateral recess. The recesses help to reinforce and rigidify each hook arm.

The hanging plant saucer of the present invention is also readily stackable for shipping, storage and packaging. As manufactured in the molded condition, the three pairs of hook arms, six in total, lay flat in the plane of the circular lip. Further, the sidewall tapers outwardly with the radially inwardly projecting ribs extending the full length of the sidewall so as to allow for easy stackability. The upwardly projecting protrusions in the saucer bottom surface are also shaped and spaced for ready stackability.

Accordingly, it is another object of the present invention to provide a hanging plant saucer in accordance with the previously stated object which has a bowl-shaped base with a generally circular planar lip extending peripherally around the base upper edge and a plurality of hook arm pairs which, when assembled, extend upwardly from the base peripheral lip for engaging either the plant pot, or support wires or chains used for suspending the plant pot.

It is still another object of the present invention to provide a hanging plant saucer in accordance with the preceding objects which has a plurality of pairs of opposed hook arms bent upwardly from a generally horizontal position, as manufactured in the molded condition, to a generally vertical position and assembled together, for the in use condition, by a friction or interference fit between molded connecting elements on each pair of hook arms.

It is a further object of the present invention to provide a hanging plant saucer in accordance with the preceding objects which has a plurality of opposed hook arm pairs extending from a base supporting a plant pot, with the base including a plurality of upward projections for elevating the plant pot above a bottom surface of the base.

It is a still further object of the present invention to provide a hanging plant saucer in accordance with the preceding objects which has a plurality of opposed hook arm pairs extending vertically from a living hinge formed at an extension of the base peripheral lip so that a double thickness of material is provided by each pair of opposed hook arms to increase strength of support for the hanging plant saucer.

It is yet another object of the present invention to provide a hanging plant saucer in accordance with the preceding objects which is sturdy and of robust construction, yet lightweight and easy to handle and which can be readily stacked with any number of other saucers of similar design for easy transport, storage and packaging.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the hanging plant saucer disclosed herein, and are for illustrative purposes only. Other embodiments that are substantially similar can use other components that have a different appearance.

DETAILED DESCRIPTION OF THE PREFERRED EMBODIMENTS

Figure 1:
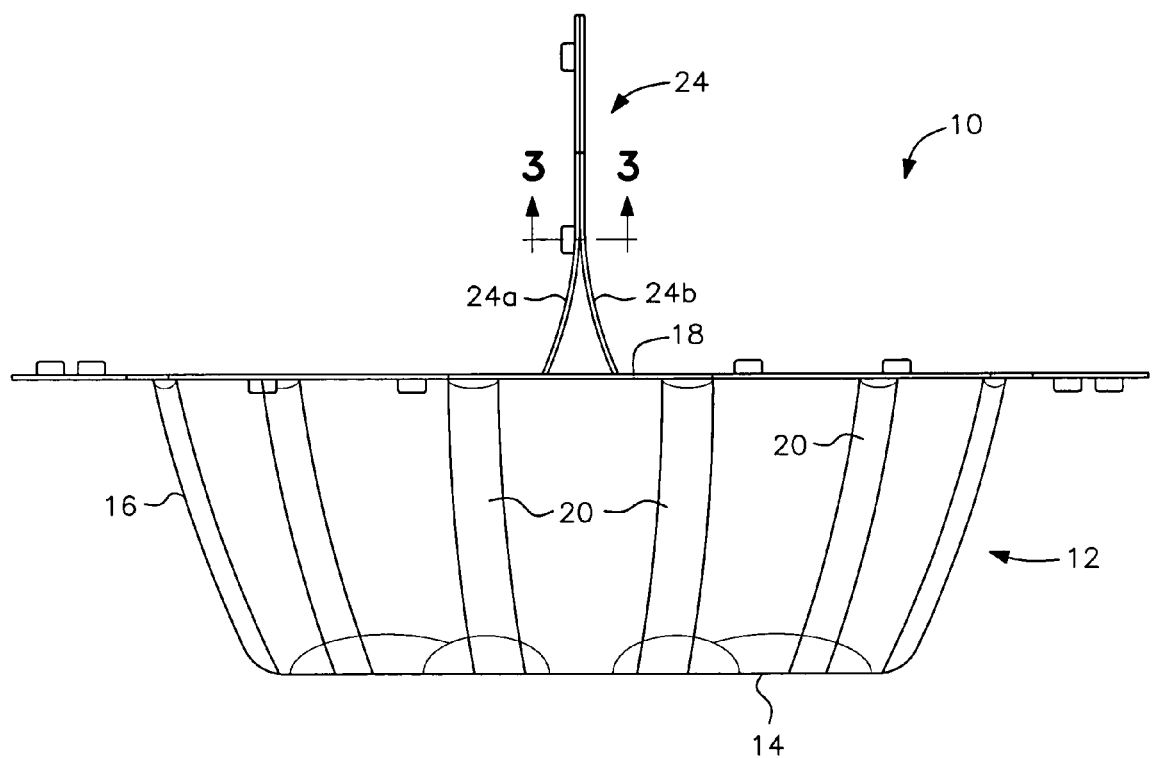
FIG. 1 is a side elevational view of the hanging plant saucer according to the present invention with one pair of opposed hook arms elevated above a base of the saucer in an assembled position and two pairs of opposed hook arms shown in a molded position.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 4, in particular, a hanging plant saucer embodying the teachings of the present invention is generally designated by reference numeral 10. With reference to its orientation in FIG. 1, the hanging plant saucer includes a base, generally designated by reference numeral 12, having a bottom surface 14 and an outwardly tapering sidewall 16 extending upwardly from the bottom surface 14. A generally circular planar lip 18 extends around the periphery of the upper edge of sidewall 16. The sidewall 16 also includes a plurality of radially inwardly projecting ribs 20 as seen best in FIG. 2. Projecting upwardly from the bottom surface 14 are a plurality of equi-spaced protrusions 22, which extend radially outwardly from the center of the bottom surface 14. The protrusions 22 are generally in the shape of one-half of a football or a prolate spheroid. The protrusions 22 and especially the circular lip 18 and inwardly projecting ribs 20 aid in providing overall rigidity and stiffness to saucer base 12.

Figure 2:
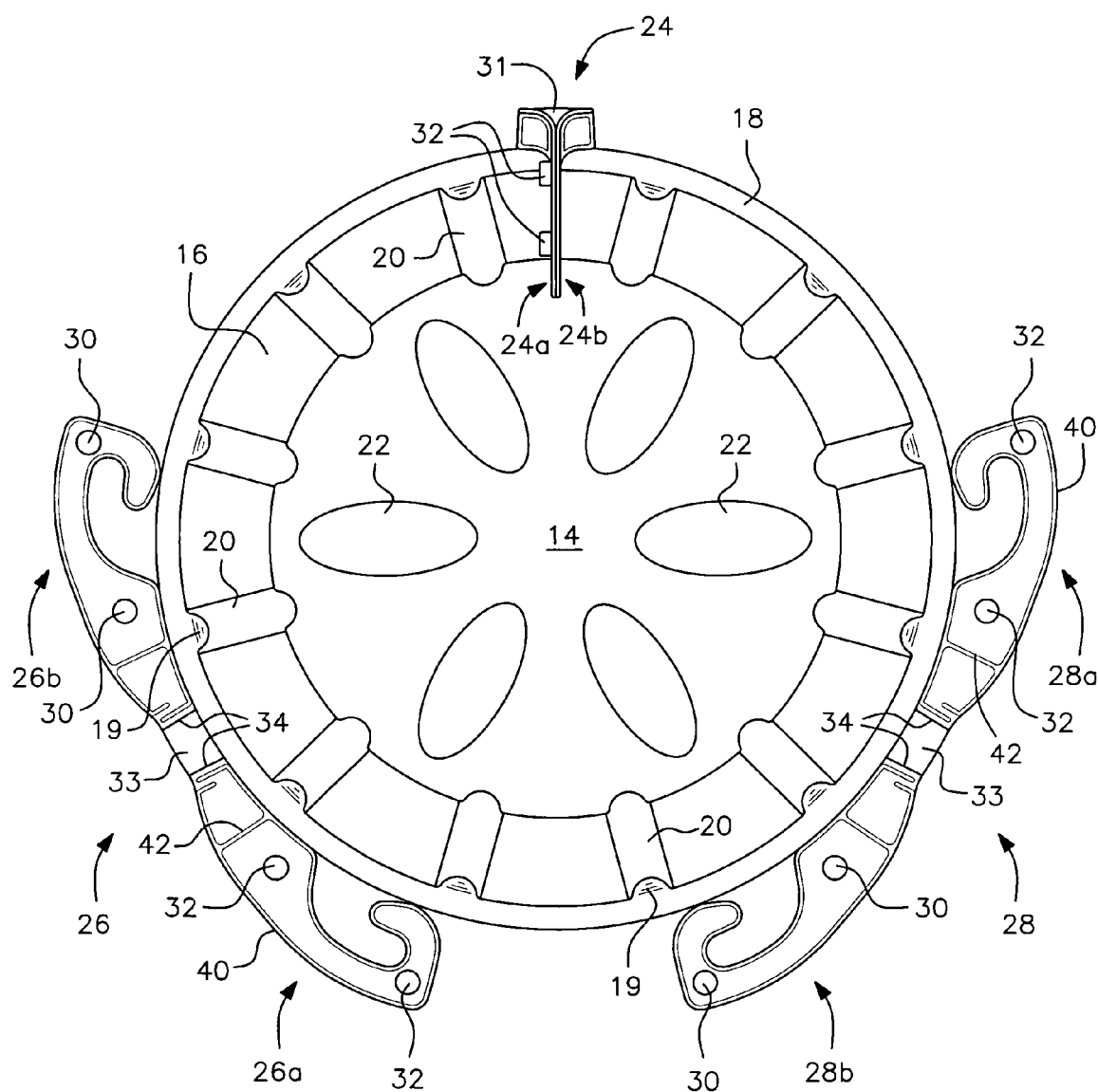
FIG. 2 is a top plan view of the hanging plant saucer of FIG. 1.
Figure 3:
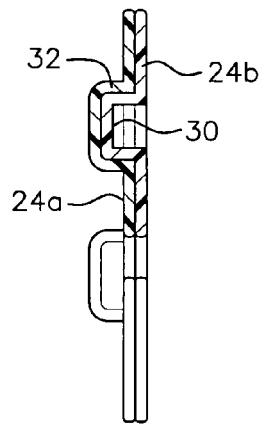
FIG. 3 is a sectional view taken along line 3-3 of FIG. 1.

In FIGS. 1 and 2, three pairs of hook arms 24, 26 and 28 are shown. Hook arm pair 26, formed of arms 26a, 26b, and hook arm pair 28, formed of arms 28a, 28b, are shown in the as molded condition. In contrast, in FIGS. 1 and 2, hook arm pair 24, including arms 24a, 24b, is shown in the assembled condition. The hook arms of each pair are attached to the planar lip 18 at their bases through lip extensions 33 which are integral with and extends outwardly from the lip 18. While three pairs of hook arms are preferred for the present invention, four or more could also be used, or even two, depending upon the intended usage. Since the hanging plant saucer 10 is molded as one piece with the hook arms in a generally horizontal position in alignment with planar lip 18 as manufactured for ease of stackability and relative height, the spacing and length of the hook arms may become an issue if too many hook arms are employed.

Each of the hook arms 24a, 24b, 26a, 26b, 28a and 28b preferably includes a molded edge recess 40 which extends about substantially the entire periphery of each hook arm. Each hook arm also includes one or more lateral recesses 42. The recesses 40 and 42 help to reinforce and rigidify each hook arm.

The hanging plant saucer 10 is molded as a single piece from a suitable thermoplastic material by any suitable molding process, thermal forming process or other suitable process as known to those skilled in the art. In a preferred embodiment, the saucer 10 is made from a clear thermoplastic material, preferably polyethylene terephalate (PET). The hook arms 24a, 24b, 26a, 26b, 28a and 28b are preferably formed in a laying flat condition co-planar with projections 33 and planar lip 18, as shown for hook arm pairs 26, 28 in FIG. 2. The thickness of the molded thermoplastic material should be great enough to provide the necessary stiffness and rigidity to the saucer 10, without being too great to significantly increase the cost and weight of the saucer. Hence, the thickness should preferably be no less than about 0.25 millimeters (mm), and no greater than about 1.0 mm, preferably about 0.5 mm.

Figure 4:
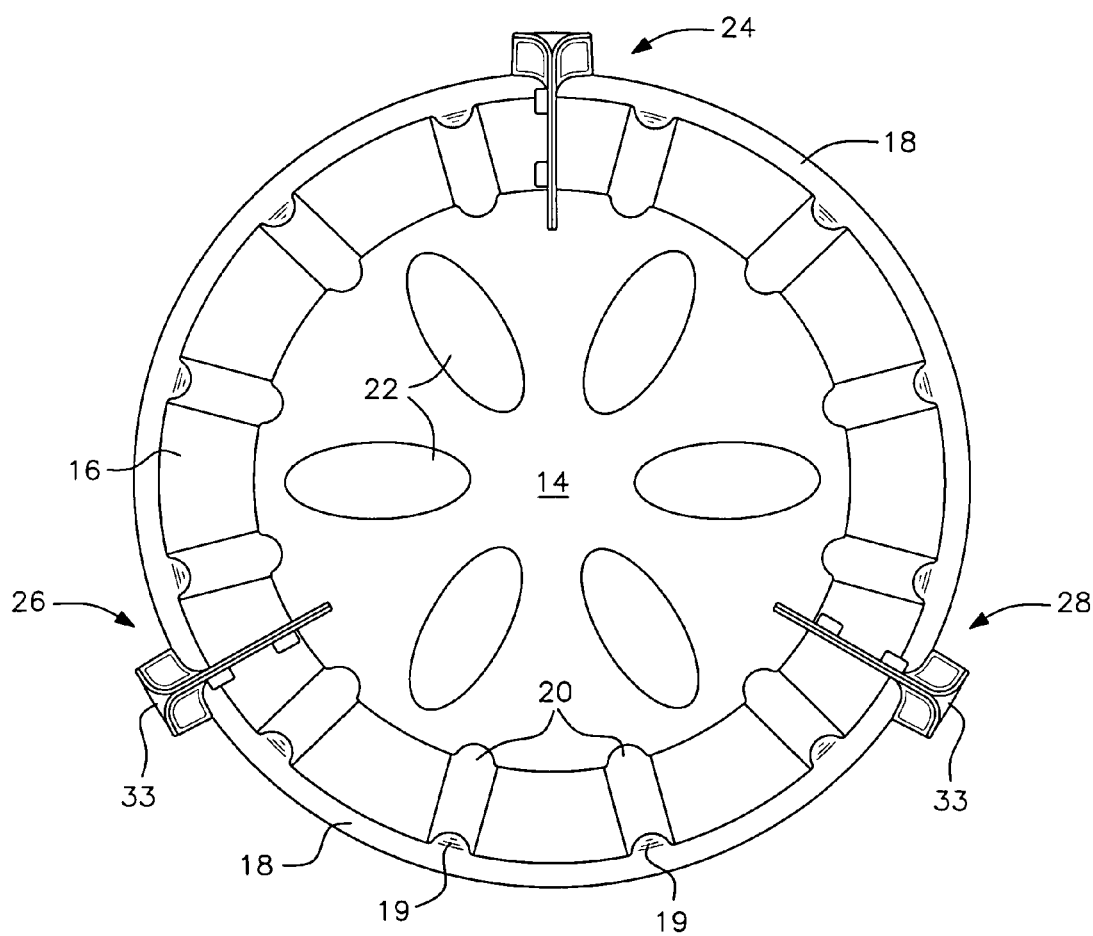
FIG. 4 is a top plan view, similar to the view shown in FIG. 2, with all three pairs of opposed hook arms bent upwardly and fitted together in the assembled position.

As shown in FIGS. 2 and 4, sidewall 16 of hanging plant saucer 10 preferably includes twelve inwardly projecting ribs 20 equally spaced around the periphery of the bottom surface 14 and the planar lip 18. As shown, the ribs 20 extend from the bottom surface 14 to the underneath side of the planar lip 18, where they are slightly tapered downwardly at 19, which taper assists in the stackability of multiple saucers 10. The ribs 20 have a generally curved cross-section and project approximately ¼ inch to ⅜ inch inwardly from the sidewall 16.

The bottom surface 14 preferably includes six equi-spaced radial protrusions 22, with their outer ends preferably positioned intermediate to adjacent projecting ribs 20. The protrusions 22 preferably project to a maximum height of approximately ⅜ of an inch above the bottom surface 14 of the base 12 to provide a space or gap above the bottom surface of the saucer for supporting a plant pot. This spacing prevents the plant pot from sitting in collected water at the bottom surface of the base and promotes the health of the plant.

In addition, the three pairs of hook arms 24, 26 and 28 and their attaching projections 33 are also equally spaced around the periphery of lip 18, and preferably positioned intermediate adjacent pairs of projecting ribs 20 which are intermediate an adjacent pair of protrusions 22. This symmetry among the projecting ribs 20, oblong protrusions 22 and hook arm pairs 24, 26 and 28 also adds to the structural integrity and overall rigidity of the saucer 10.

Figure 6:
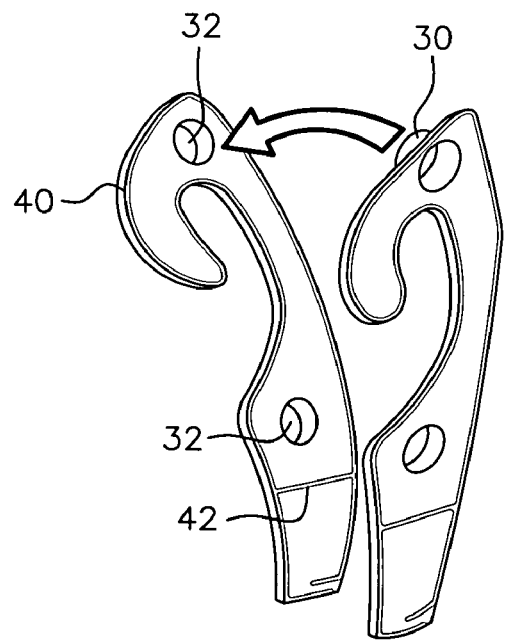
FIG. 6 is a perspective view of a pair of opposed hook arms in accordance with the present invention, illustrating a direction of interengagement of the two hook arms into an assembled position.

To secure the pairs of hook arms together in the assembled condition from the molded condition, use is made of molded connecting elements on each pair of opposed hook arms. In the preferred embodiment the molded connecting elements are in the form of male projections 30 and female recesses 32 which are each located respectively on one of the two arms of each pair of hook arms 24, 26 and 28. With reference to FIG. 2 and to hook arm pair 26 including arms 26a, 26b, for example, each arm 26a, 26b is bent along a living hinge 34 on each side of extensions 33 towards each other, as shown schematically in FIG. 6. Each pair of hook arms is then assembled by fitting male projections 30 within complementary female recesses 32 by a friction or interference fit, as shown in more detail in FIG. 3. The exterior surface of the male projections 30 preferably has a width of approximately ⅜ of an inch and extends from one side of the hook arm for approximately ¼ of an inch. Similarly, the complementary female recesses 32 include a width of approximately ⅜ of an inch and a depth of approximately ¼ of an inch.

Figure 5:
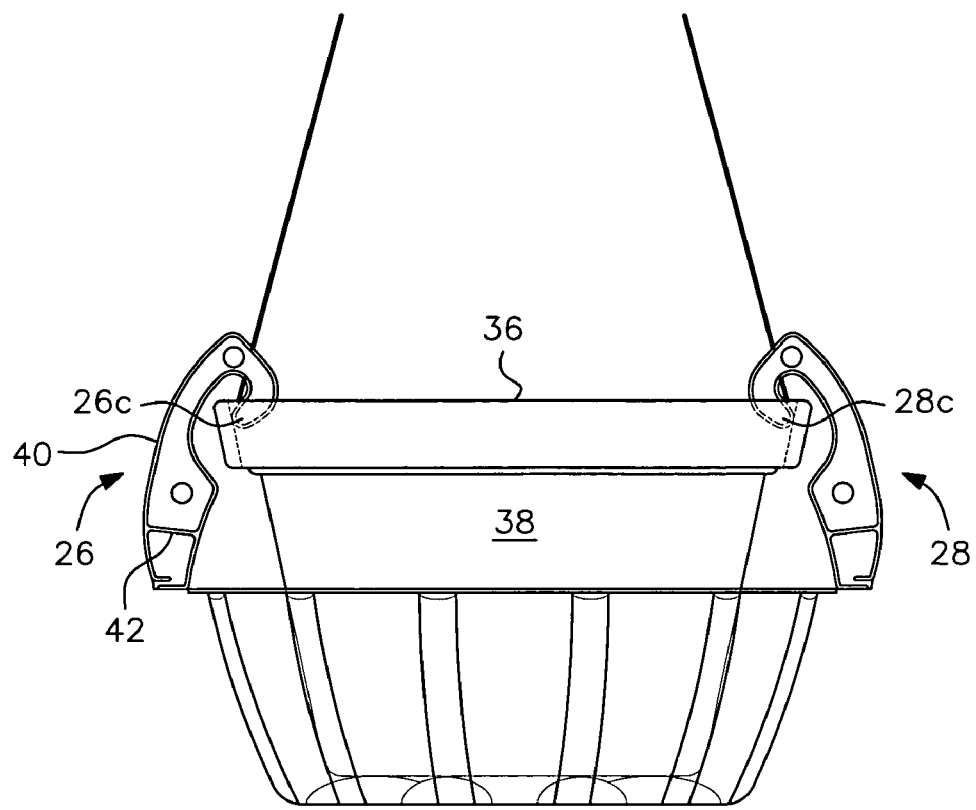
FIG. 5 is a side view of the hanging plant saucer of the present invention anchored by its hook arms to an upper edge of a plant pot suspended by wires.

As shown in FIG. 4, the three pairs of opposed hook arms 24, 26 and 28 are bent upwardly along living hinges 34 on each side of extensions 33 extending outwardly from planar lip 18 and are assembled together. The thus formed pairs of opposed hook arms are therefore of double thickness and provide increased strength for engaging with an upper circumferential edge 36 of a flower pot 38 by hook arm ends 26c and 28c as shown in FIG. 5. In FIG. 5, the flower pot 38 is suspended by wires.

Figure 7:
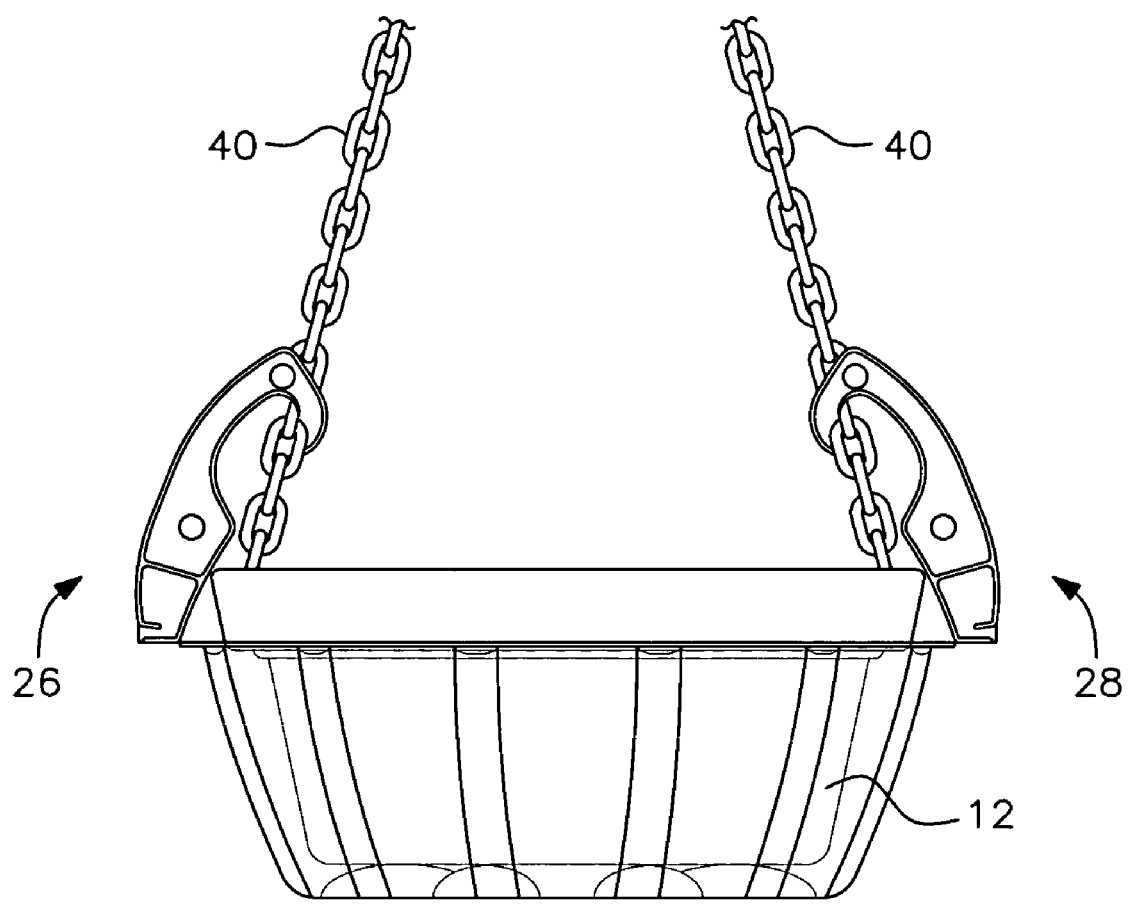
FIG. 7 is a side view illustrating the interengagement of opposed hook arms with a support chain for a plant pot to secure the plant saucer with respect to the plant pot.

In FIG. 7, the pairs of opposed hook arms 26 and 28 are shown engaging chain supports 40. Alternatively, the hook arms can engage the suspension wires shown in FIG. 5. The base 12 is thereby elevated with the projections 22 engaging the bottom of the flower pot.

By the present invention, a robust plant saucer collects water from the bottom of a flower pot while supporting the flower pot above the bottom surface of the base. The plant saucer is alternately supported by either the flower pot or the wire or chain suspension lines which hold the flower pot in an elevated position.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A hanging plant saucer for surrounding a hanging flower pot, said hanging plant saucer comprising a one-piece construction having a bowl-shaped base with a generally circular planar lip around an upper edge periphery of said base and a plurality of pairs of interconnectable hook arms connected to the base, each pair of interconnectable hook arms including a first arm and a second arm that have substantially a same peripheral shape, said first arm having a first connecting structure and said second arm having a second connecting structure complementary with said first connecting structure to connect therewith when said arms are brought into abutment with one another, each of said first and second arms being joined by a respective living hinge to an extension of said planar lip positioned between said arms and integral with said planar lip, said arms and said extension being substantially co-planar with said planar lip in an as-molded condition, said first and second arms in an in-use condition being folded upwardly toward one another along the respective living hinges to be brought into abutment and engaged with one another by connection of said first and second connecting structures so that each pair of interconnectable arms makes a single hook of double thickness to support the base around a hanging flower pot.

2. The hanging plant saucer of claim 1, wherein said first and second connecting structures include complementary-shaped elements that are interconnected in use by frictionally engaging said complementary-shaped elements.

3. The hanging plant saucer of claim 2, wherein the complementary-shaped elements are male projections and female recesses.

4. The hanging plant saucer of claim 3, wherein there are three pairs of interconnectable hook arms.

5. The hanging plant saucer of claim 1, wherein the base includes a bottom surface having upwardly extending projections for supporting the plant pot above the bottom surface.

6. The hanging plant saucer of claim 5, wherein a sidewall of said base tapers constantly and continuously radially outwardly from the bottom surface to the generally circular planar lip.

7. The hanging plant saucer of claim 6, wherein the planar lip extends parallel to the bottom surface.

8. The hanging plant saucer of claim 6, wherein said sidewall includes a plurality of vertically extending, radially inwardly projecting ribs.

9. The hanging plant saucer of claim 1, wherein the saucer is molded as one piece and, in the as molded condition, the plurality of pairs of interconnectable hook arms extend radially outwardly from the planar lip.

10. The combination comprising:
a flower pot and a suspension system for elevating the flower pot above a floor; and
a saucer made of one molded piece and having a base with a generally circular planar lip around an upper edge periphery of said base and a plurality of pairs of interconnected hook arms connected to the base, each pair of interconnected hook arms including a first arm and a second arm that have substantially a same peripheral shape, said first arm having a first connecting structure and said second arm having a second connecting structure complementary with said first connecting structure to connect therewith when said arms are brought into abutment with one another, each of first and second arms being joined by a respective living hinge to an extension of said planar lip positioned between said arms and integral with said planar lip, said arms and said extension being substantially co-planar with said planar lip in an as-molded condition, said first and second arms in an in-use condition being folded upwardly toward one another along the respective living hinges to be brought into abutment and engaged with one another by connection of said first and second connecting structures so that each pair of interconnected arms makes a single hook of double thickness for engaging the suspension system or the flower pot for supporting the base around the flower pot.

11. The combination of claim 10, wherein the suspension system includes one of chains and wires connected at one end to the flower pot.

12. The combination of claim 10, wherein the base includes a bottom surface having upwardly extending projections for supporting the flower pot above the bottom surface.

13. A hanging plant saucer for surrounding a hanging flower pot, said hanging plant saucer comprising:
a base having a planar lip around an upper edge periphery of said base, said planar lip having a plurality of integrally formed extensions at spaced locations therearound, said extensions extending radially outwardly from and being substantially co-planar with said lip; and
a plurality of hook arm pairs corresponding in number with said extensions, each hook arm pair including a first arm and a second arm, said arms being integrally connected with and positioned on either side of a respective one of said extensions through a respective living hinge, said arms being substantially co-planar with said planar lip and said extension in an as-molded condition, said first and second arms in an in-use condition being folded upwardly toward one another along their respective living hinges to be brought into abutment with one another and interconnected together by frictionally inter-engaging complementary elements so that, once inter-connected, the first and second arms of each hook arm pair make a single hook of double thickness.

14. The hanging plant saucer of claim 13, wherein the complementary elements are male projections on the first hook arm of a pair and female recesses on the second hook arm of the pair.

15. The hanging plant saucer of claim 13, wherein there are three pairs of interconnected hook arms and three extensions.

16. The hanging plant saucer of claim 13, wherein the hanging plant saucer is molded in one piece of thermoplastic material.

17. The hanging plant saucer of claim 16, wherein the thermoplastic material has a thickness no greater than 1.0 mm.

18. The hanging plant saucer of claim 16, wherein the saucer is stackable in the as molded condition with multiple other saucers of a same construction.

19. The hanging plant saucer of claim 13, wherein a sidewall of said base tapers constantly and continuously radially outwardly from a bottom surface of said base to the planar lip.

20. The hanging plant saucer of claim 19, wherein said sidewall includes a plurality of vertically extending, radially inwardly projecting ribs.

21. The hanging plant saucer of claim 20, wherein the planar lip extends parallel to the bottom surface.

* * * * *